July 15, 1924.                                                                   1,501,757
J. DISCHLER
SPRING VEHICLE WHEEL
Filed Nov. 19, 1923

INVENTOR
John Dischler
BY
ATTORNEY

Patented July 15, 1924.

1,501,757

UNITED STATES PATENT OFFICE.

JOHN DISCHLER, OF ADAMS, WISCONSIN.

SPRING VEHICLE WHEEL.

Application filed November 19, 1923. Serial No. 675,482.

*To all whom it may concern:*

Be it known that I, JOHN DISCHLER, a citizen of the United States, residing at Adams, in the county of Adams and State of Wisconsin, have invented certain new and useful Improvements in Spring Vehicle Wheels, of which the following is a specification.

This invention relates to improvements in resilient wheels as used for vehicles and has as one of its objects to provide a wheel having a tire, the resiliency of which is attained mechanically rather than pneumatically.

Another purpose is to produce a resiliently tired wheel that is wholly unaffected by punctures, not subject to blowouts and which can be cheaply constructed.

These and like other aims and objects are attained by the novel construction and arrangement of parts hereafter described and shown in the accompanying drawing, forming a part hereof, and on which:—

Figure 1:
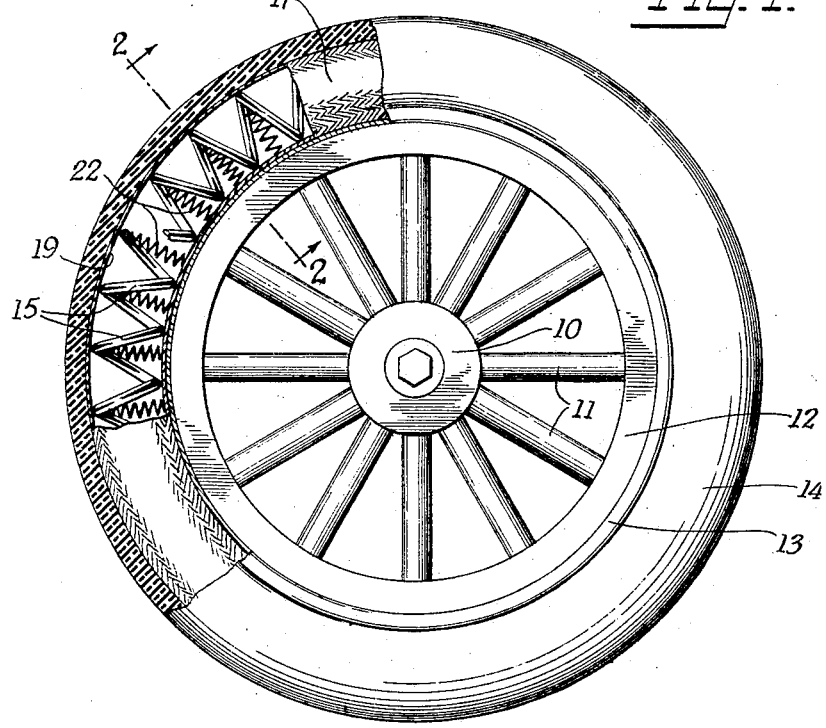
Figure 1 is a side elevational view of a wheel made in accordance with the invention, parts being broken away to show the construction.
Figure 2:
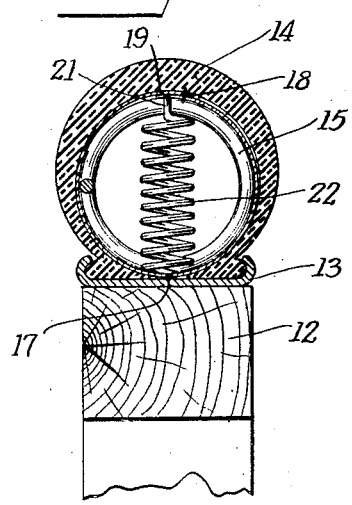
Figure 2 is a transverse sectional view of the tire, drawn to an enlarged scale, the section being taken on line 2—2 of Figure 1.

In the drawing, the numeral 10 designates the hub of the wheel, from which radiate spokes 11 fixed at their outer ends in the rim 12.

Disposed on the rim is a band 13 having inturned edges adapted to engage the tire or shoe 14 in the usual manner, these several parts being conventional in type and forming no part of the invention.

A stiff helically wound spring 15 is arranged interjacent the tire, said spring being of suitable diameter to fill the space and of such length that its ends abut when assembled, the coils being held in clips 16 arranged at spaced intervals and secured in a strip of canvas 17 or like strong but flexible material, this material completely enveloping the spring, being secured by stitching 18 at the overlapped joint 19, preferably disposed at the outer portion of the device, forming a casing which can be inserted in the tire shoe in a manner readily apparent.

Figure 3:
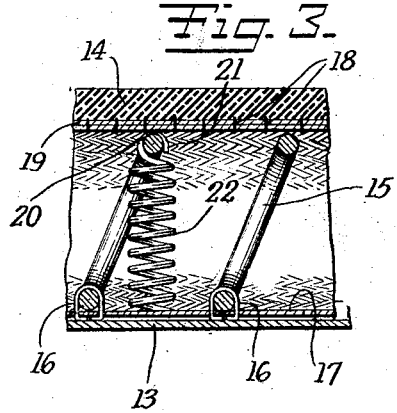
Figure 3 is a fragmentary longitudinal sectional view taken on the center of the same.

The clips 16 are arranged at the inner side of the coil, each convolution of which is notched, as indicated at 20, see Figure 3, and engaged in each notch is an eye 21 formed on the end of a helically wound compression spring 22, its opposite end abutting the casing 17 midway between the clips 16 which rest upon the band 13.

In operation, when the device has been assembled, the coils of the spring 15 receive the thrust of the tire shoe, which if excessive, cause the coils to bend angularly, immediately recovering their normal position and affording substantially the resiliency of a pneumatic or inner tube.

In addition the effect is supplemented by the compression springs 22 disposed between each of the coils of the circumambient spring and exerting an outward pressure against the tread portion of the tire.

Having thus described my invention, what I claim as new and desire to secure by Letters Patent, is:—

1. A resilient tire comprising in combination with a shoe and a rim around which the shoe is secured, of a helically coiled open wound circumferentially disposed spring enveloped in said shoe, a fabric casing intervening between said spring and shoe, and clips fixed in said casing one for each coil of said spring, said clips being seated on said rim.

2. A resilient tire comprising in combination with a vehicle rim and shoe, of a helical spring disposed longitudinally in said shoe, a fabric casing interjacent the spring and shoe, clips for each coil of said spring, said clips being secured in said casing to rest on the rim, and supplementary compression springs engaging each coil of the first named spring at their outer end and abutting the casing at points between said clips.

3. A resilient tire comprising in combination with a vehicle rim and shoe, of a helical spring disposed longitudinally in said shoe, a tubular casing enclosing said spring, means for holding each coil of the spring from movement relative to the casing, each coil having a notch in its portion adjacent the tread surface of said shoe, compression springs disposed transversely between each of the coils of the first named spring, radial with respect to the tire, and eyes on said compression springs engaging the mentioned notches, said compression springs resting at their opposite inner ends on said casing directly over the rim.

In witness whereof I have affixed my signature.

JOHN DISCHLER.